United States Patent
Numminen et al.

(10) Patent No.: US 7,346,349 B2
(45) Date of Patent: Mar. 18, 2008

(54) METHOD FOR CONTROLLING TERMINAL FAULT CORRECTIONS IN CELLULAR SYSTEM

(75) Inventors: Jussi Numminen, Turku (FI); Antti Toskala, Espoo (FI); Hannu Pirila, Littoinen (FI); Gairn Kalla, Helsinki (FI)

(73) Assignee: Nokia Corporation (FI)

( * ) Notice: Subject to any disclaimer, the term of this patent is extended or adjusted under 35 U.S.C. 154(b) by 568 days.

(21) Appl. No.: 10/702,217

(22) Filed: Nov. 4, 2003

(65) Prior Publication Data
US 2004/0120265 A1  Jun. 24, 2004

Related U.S. Application Data

(60) Provisional application No. 60/424,500, filed on Nov. 6, 2002.

(51) Int. Cl.
*H04Q 7/22* (2006.01)
*H04L 12/26* (2006.01)

(52) U.S. Cl. ............... 455/434; 455/435.1; 455/450; 455/509; 455/511; 455/515; 370/252; 370/347

(58) Field of Classification Search ............ 455/418, 455/419, 420, 503, 67.11, 423, 509–515, 455/435.1, 434, 435.2, 450, 453, 414.1, 414.3; 370/241, 328, 252, 347; 714/758, 747, 798, 714/799; 713/100, 161
See application file for complete search history.

(56) References Cited

U.S. PATENT DOCUMENTS

| | | | |
|---|---|---|---|
| 5,548,586 A | 8/1996 | Kito et al. | |
| 5,598,417 A | 1/1997 | Crisler et al. | |
| 5,799,018 A | 8/1998 | Kanekiyo et al. | |
| 6,006,091 A * | 12/1999 | Lupien | 455/435.1 |
| 6,075,779 A | 6/2000 | Agarwal et al. | |
| 6,597,921 B2 * | 7/2003 | Thandu | 455/517 |
| 6,782,274 B1 * | 8/2004 | Park et al. | 455/552.1 |
| 6,859,441 B2 * | 2/2005 | Dick et al. | 370/252 |
| 2003/0100291 A1 * | 5/2003 | Krishnarajah et al. | 455/410 |
| 2004/0203714 A1 * | 10/2004 | Van Lieshout et al. | 455/423 |

OTHER PUBLICATIONS

"3rd Generation Partnership Project; Technical Specification Group Services and System Aspects; Provision of UE specific behaviour information to network entities (Release 6)" 3GPP TR 23.895 V6.2.0 (Jun. 2003).

* cited by examiner

*Primary Examiner*—Lester Kincaid
*Assistant Examiner*—Emem E. Stephen

(57) ABSTRACT

This invention addresses the problem of latency of response regarding information relying on an IMEISV from a CN. This is possible by defining the early RRC connection bits' indication to determine the supported signalling schemes and providing the IMEISV information from the terminal to the network. After this point the CN is able providing this mapping information to the radio access network before actual radio links are utilized. The idea here is for early RRC message information to be used for indicating what version of bitmap correction terminal capabilities refers to and what procedures can be utilized while waiting for this bit map information from the CN. Using this approach the length of the early RRC message can be kept short, the content of corrections can be well defined saving signalling bits, and the concern of a fast available indication on the connection set-up phase can still be addressed.

20 Claims, 3 Drawing Sheets

METHOD FOR CONTROLLING TERMINAL FAULT CORRECTIONS IN CELLULAR SYSTEM

This application claims the benefit of U.S. Provisional Application No. 60/424,050 filed Nov. 6, 2002.

FIELD OF THE INVENTION

This invention generally relates to cellular systems and networks and more specifically to managing and controlling different behavior of a terminal in cellular systems and networks for correcting terminal errors.

BACKGROUND OF THE INVENTION

This invention is related to cellular systems and differently behaving terminal implementations. As an example, a UTRAN (universal terrestrial radio access network) is "rich in options" and the test cases will be available in some cases much later as terminals are introduced into the market. Also many features will not be available in the networks when first networks are launched, thus there is a probability of two cases to occur:
1) Standard errors, where several manufacturers have different/conflicting/not fully functional features due to errors in standards.
2) Implementation errors due to various reasons where effort has been taken to implement and test the feature but the outcome does not match the expectation in-line with the specification.

SUMMARY OF THE INVENTION

The object of the present invention is to provide a methodology of managing and controlling different behavior of a terminal (user equipment) in cellular systems and networks and correcting terminal errors, especially when manufacturer specific error data is not available or known from network error databases.

According to a first aspect of the present invention, a method for correcting/adapting terminal errors in a cellular system comprises the steps of: sending a control/report signal to a network of the cellular system by a user equipment or terminal of the cellular system for initiating setup procedures, said control/report signal is indicative of a version of a bit map supporting error correcting functionalities of the terminal; determining by the network whether new bit map related information is required for completing the setup procedures by the terminal; performing the setup procedures at the terminal using instructions contained in a command/information signal while waiting for the new bit map related information from the network for completing said procedures; and completing the setup procedures by the terminal using further instructions contained in the command/information signal sent by the network, wherein said instructions are configured by the network based on a new bit map signal generated by the network. Further, the control/report signal also may contain an international mobile station equipment and software version number.

In further accord with the first aspect of the invention, the command/information signal is a measurement control signal and the step of completing the setup procedures comprises the steps of: configuring by the network and sending said security mode command signal to the UE; and performing a security mode setup by the terminal using said security mode command signal.

Still further according to the first aspect of the invention, the command/information signal is a radio bearer setup signal, and the step of completing the setup procedures comprises the steps of: configuring by the network and sending said radio bearer setup signal to the UE; and completing a bearer setup by the terminal using said radio bearer setup signal.

Further still according to the first aspect of the invention, the cellular system may be a universal mobile telecommunications system. Further, the network may comprise a universal terrestrial radio access network and a core network. Still further, the universal terrestrial radio access network may comprise a serving radio network controller.

In further accordance with the first aspect of the invention, wherein the cellular system is the universal mobile telecommunications system comprising the universal terrestrial radio access network and the core network and wherein the universal terrestrial radio access network comprising the serving radio network controller, the command/information signal may be a security mode command signal, which is sent to the terminal by the serving radio network controller; said security mode command signal is generated by the serving radio network controller after receiving the new bit map signal.

Yet further still according to the first aspect of the invention, wherein the cellular system is the universal mobile telecommunications system comprising the universal terrestrial radio access network and the core network and wherein the universal terrestrial radio access network comprising the serving radio network controller, the command/information signal may be a radio bearer setup signal, which is sent to the terminal by the serving radio network controller, said radio bearer setup signal is generated by the serving radio network controller after receiving the new bit map signal.

According further to the first aspect of the invention, wherein the cellular system is the universal mobile telecommunications system comprising the universal terrestrial radio access network and the core network and wherein the universal terrestrial radio access network comprising the serving radio network controller, the control/report signal may be a RACH RRC connection request signal, which is sent to the serving radio network controller. Further, the step of determining by the network whether the new bit map related information is required for completing the setup procedures by the terminal may be performed by the serving radio network controller upon receiving and based on the RACH RRC connection request signal. Still further, after the step of determining by the network if the new bit map related information is required, the method may comprise the steps of: sending a FACH RRC connection setup signal, based on the RACH RRC connection request signal, to the terminal by the serving radio network controller; setting up a connection by the terminal using the FACH RRC connection setup signal based on the FACH RRC connection setup signal; and sending a DCH RRC connection setup complete signal to the serving radio network controller by the terminal. Yet still further, the method may comprise the steps of: sending an RRC initial direct transfer signal to the universal serving radio network controller by the terminal, said RRC initial direct transfer signal, if it is determined that the new bit map related information is required, contains an international mobile station equipment and software version (IMEISV) number; sending an RRC initial UE message signal to the core network by the terminal (12), said RRC initial UE message signal contains a request for a new bit map and the IMEISV number; and sending a measurement control signal to the terminal by the serving radio network controller. Also further, the step of performing the setup procedures at the terminal, while waiting for the bit map related information from the network, may be performed by configuring measurement configurations based on the measurement control signal by the terminal. Also still further, after the step of performing the setup procedures at the terminal, the method may further comprise the steps of: delaying further setup procedures of the terminal until generating the new bit map signal by the core network, if it is determined that said new bit map signal is required; sending a common ID (IMSI: international mobile equipment identity) signal and the new bit map signal generated by the core network to the serving radio network controller by the core network; determining by the serving radio network controller if the new bit map signal has to be converted to match the IMEISV number of the terminal; and converting the new bit map signal to match the IMEISV number of the terminal by the serving radio network controller.

According still further to the first aspect of the invention, wherein the cellular system is the universal mobile telecommunications system comprising the universal terrestrial radio access network and the core network and wherein the universal terrestrial radio access network comprising the serving radio network controller, after the step of performing the setup procedures at the terminal, the method may further comprise the steps of: delaying further setup procedures of the terminal until generating the new bit map signal by the core network, if it is determined that said new bit map signal is required; and sending a common ID (IMSI) signal and the new bit map signal generated by the core network to the serving radio network controller by the core network. Further still, the new bit map signal may be generated using a core network protocol block of the core network and an error database block of the core network.

According to a second aspect of the invention, a cellular system utilizing a special procedure for correcting/adapting terminal errors comprises: a terminal or user equipment, for providing a control/report signal which is indicative of a version of a bit map supporting error correcting functionalities of the terminal, responsive to a command/information signal for performing setup procedures of the terminal; and a network, responsive to said control/report signal, for determining if new bit map related information is required for completing the setup procedures by the terminal using said control/report signal, for providing said command/information signal to the terminal before said determination using information contained in said control/report signal and after said determination using a new bit map signal generated by the network.

According further to the second aspect of the invention, the network may further comprises: a universal terrestrial radio access network, responsive to a common ID (IMSI) signal, to the new bit map signal and to the control/report signal, for determining if new bit map related information is required for completing the setup procedures by the terminal using said control/report signal, for providing said command/information signal to the terminal before said determination using information contained in said control/report signal and after said determination using the new bit map signal generated by the network; and a core network, responsive to the control/report signal, for generating the new bit map signal, for providing the common ID (IMSI) signal and for providing the new bit map signal to the universal terrestrial radio access network.

According still further to the second aspect of the invention, the control/report signal can also contain the international mobile station equipment and software version number (IMEISV).

BRIEF DESCRIPTION OF THE DRAWINGS

For a better understanding of the nature and objects of the present invention, reference is made to the following detailed description taken in conjunction with the following drawings, in which.

DISCLOSURE OF INVENTION AND BEST MODE FOR CARRYING OUT THE INVENTION

Figure 1A:
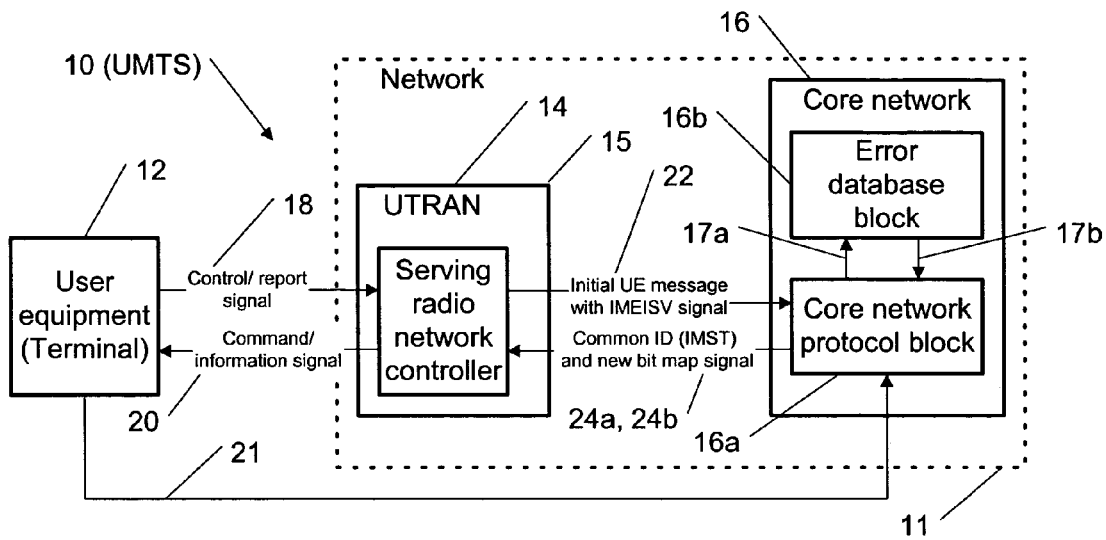
FIG. 1a is a block diagram representing an example of a cellular system (e.g., UMTS) for correcting terminal errors, according to the present invention.

1. The present invention provides a methodology managing and controlling different behavior of a terminal (user equipment, UE) in cellular systems and networks, and how to combine different solutions to get a more novel way of dealing with this aspect and correcting terminal errors. In this invention the idea is to define several meanings to the early signalling bits in a manner, which is useful to the system in the early phase of the connection setup prior the UE specific errors are available from the error databases. In considering these different solutions apart this idea, it has become apparent that one single solution is not sufficient to cater all possible error scenarios in the future. Several proposals in this area are:

1. Interim marker, aiming to indicate testing coverage of a terminal.
2. Spare bit string information included in an early radio resource control (RRC) message, reserved for indicating a corrected terminal behavior. This requires that the bit needs to be set after defining what it stands for and has been agreed. It should be noted that this mechanism cannot cover terminals already released into the market before an error has been detected.
3. A time stamping of information together with a very limited manufacturing code.
4. Including a sort of a "compressed" international mobile station equipment and software version number (IMEISV) information in the early RRC message.
5. An RRC extension container, which allows changing the signalling message, but not affecting already working terminal implementation.
6. Utilization of the IMEISV information for error handling. This information is available from all terminals creating the possibility to affect/create a fix to terminals already deployed into the market before the error has been detected. This information is provided to a core network via signalling when the first attachment is concurred. This information will require a longer period to be processed and forwarded back to a radio access network.

The solution for cellular system (e.g. universal mobile telecommunication system, UMTS) from above mentioned options cases are at least a) spare bit string length of, for example, 8 bits (item 2 in the above list), which is provided in the early RRC messages, b) an RRC extension container, which allows to change the RRC message later on without affecting an already working terminal in the field and c) utilization of the IMEISV information for error handling, which is a manufacturer and model specific allowing dedicated procedure per the UE.

The latter approach c) of the IMEISV has 2 different flavors on technical solution on dealing errors in radio networks;

1) the information can be provided unchanged from a core network (CN) to radio access networks, which performs a conversion on different terminal behavior based on the IMEISV.
2) Or the conversion is done in core network, and only relevant bit map information is radio access networks.

The invention addresses the point and problem on how to solve possible problems during of an initial phase of a connection set-up of a terminal, and at the same time keeping the necessary signalling changes in the terminal minimal or zero.

According to the present invention, the early RRC level message information containing e.g. 8 bits can include the following considerations:

1) What signalling bearers and other basic procedures a terminal can support before the IMEISV based more detailed error information is available. This can be possible by, e.g., indicating the testing coverage of testing in terms of a revision level related to commonly agreed testing specifications before releasing a terminal to the market.
2) What is the UE correction level, e.g. detailed indication of corrected behavior (what version of a bit map is supported). In this case the indication setting of one bit allows for an indication of several errors based on a revision level of a bit map error database specification.
3) Introducing an idea on how this available information can be combined in a novel way.

According to the present invention, early RRC message information is used to find out what version of bitmap correction terminal capabilities refers to and what procedures can be utilized while waiting for new bit map information from the core network (CN). With this approach the length of the early RCC message information can be kept very short, the content of corrections can be well defined saving signalling bits, and still this approach can address the concern of a fast available indication on a connection set up phase. This is especially true in the case when the network does not have any prior knowledge on the terminal behavior, like initial attachment procedure to any system.

This invention addresses the problem of latency of response of the information related to the IMEISV fetch from the core network. This is accomplished, according to the present invention, by defining the early RRC connection bits' indication to determine the supported signalling schemes regarding to a radio network, and hence providing the IMEISV information from the terminal to said network. After that the core network is able to provide the new or more detailed mapping information to the radio access network.

The simplest form of the invention can be such that the RRC message (for example in an RRC connection request message as discussed below) informs the network whether there is a need to wait for the new bit map at all or whether all functionalities can be progressed as expected. Then if the message indicates that terminal needs the new bit map (e.g. none of the bits are set during an early terminal implementation), then e.g. a non tested radio access bearer (RAB) configuration (or any other affected configuration) is completed only after the new bit map is received indicating the needed special behaviors for the terminal (or features that can not be activated). The flow can be, for example, that the RRC connection is set up and measurements are configured in the UE, but a radio bearer set up will not be finalized until getting the new bit map from the core network (e.g., a serving GPRS support mode (SGSN) or a mobile switchingt center), which communicates with the error database. It is also possible that if certain measurement configurations are dependant on the new bit map from the core network, then only the basic measurement configurations that were known to be compatible with all UEs are configured initially, with any reconfiguration happening after the new bit map is received.

The network can also use, before receiving the bit map related information from core network, (RAB configurations (or configurations for other functionalities currently known to be working for all UEs) and not use any specific performance enhancement methods until the new bit map is received. According to the present invention, it can be possible to apply testing coverage indication to these bits allowing a possibility to proceed configuring terminal based on the known "extended testing coverage" indication. Still those methods could be avoided where the problem has been detected by some terminals, features where all vendors have had correct implementation so far and can be used without any delay.

Once the terminals having malfunctions are fixed, it is possible that the next bit to indicate in the RRC message that this is a newer terminal and all the errors are corrected to a certain revision level or date (covered with the existing bit map specification or requirement) and thus there is no need to wait for the new bit map.

FIG. 1a is a block diagram representing only one example among many others of a cellular system (e.g., UMTS) for correcting terminal errors, according to the present invention. A user equipment (UE) or terminal 12 of a universal mobile telecommunications system (UMTS) 10 is communicating with a network 11 of the UMTS 10 for correcting terminal errors. The network 11 comprises a universal terrestrial radio access network (UTRAN) 14 and a core network (CN) 16. A serving radio network controller (SRNC) 15 is an important component of the UTRAN 14. The CN 16 contains a core network (CN) protocol block 16a and an error database block 16b. The UE sends a control/report signal 18 to the SRNC 15 and receives a command/information signal 20 from the SRNC 15. The SRNC 15 exchanges messages with the CN 16 (or the CN protocol block 16a): sending an initial UE message signal 22 to the CN 16 (or the CN protocol block 16a) and receiving common ID (IMSI: international mobile equipment identity) signal 24a and a new bit map signal 24b from the CN 16 (or the CN protocol block 16a). The CN protocol block 16a exchanges message signals 17a and 17b with the error data block 16b for generating a new bit map as discussed below. It is noted that in the alternatives covered by the present invention, the messages 22 and 18 can be sent from the UE 12 to the core network 16 directly and shown as a signal 21, and in this scenario the signal 21 (22 and/or 18) is passed by the SRNC 15 without involving any interactions.

Figure 1B:
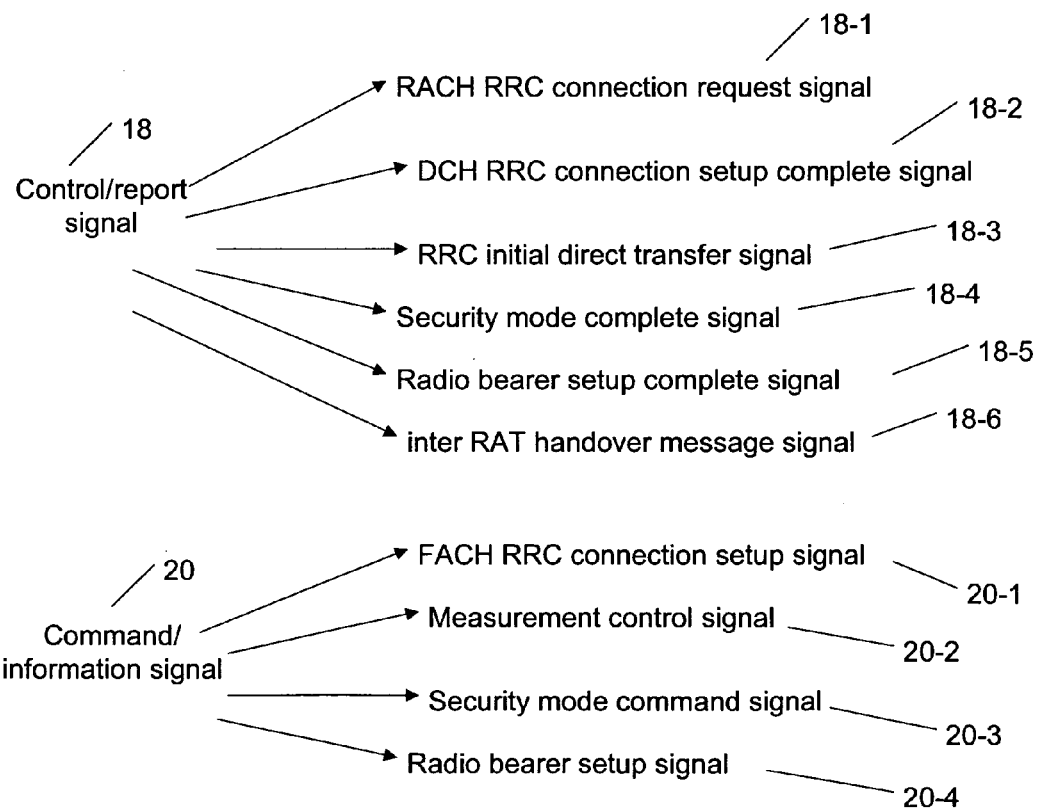
FIG. 1b is an example illustrating various types of control/report and command/information signal of FIG. 1a, according to the present invention.

FIG. 1b is an illustration of various types among many others of the control/report signal 18 and command/information signal 20 of FIG. 1a, according to the present invention. Examples of the control/report signal 22 include but are not limited to: an RACH (random access channel) RRC connection request signal 18-1, a DCH (dedicated channel) RRC connection setup complete signal 18-2, an RRC initial direct transfer signal 18-3, a security mode complete signal 18-4, a radio bearer setup complete signal 18-5 and inter RAT (radio access technology) handover message signal 18-6 to different radio systems. Examples of the command/information 20 include but are not limited to: a FACH (forward access channel) RRC connection setup signal 20-1, a measurement control signal 20-2, a security mode command signal 20-3 and a radio bearer setup signal 204. These signals are described further in regard to FIGS. 2a and 2b.

Figure 2A:
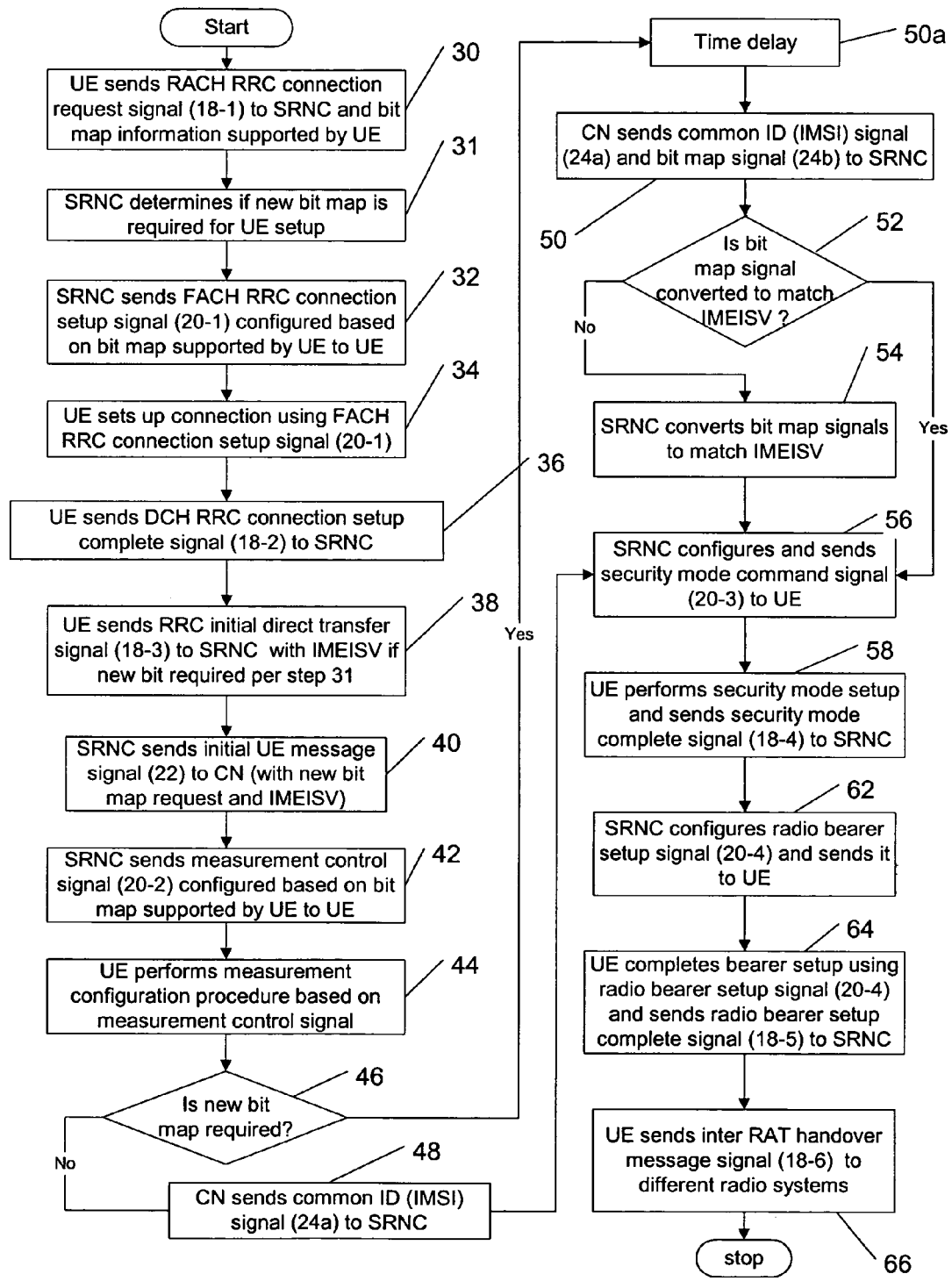
FIG. 2a is an example of a flow chart illustrating a performance of a cellular system (e.g., UMTS) for correcting terminal errors, according to the present invention.

FIG. 2a is a flow chart illustrating a performance of a cellular system (e.g., UMTS) for correcting terminal errors, according to the present invention. The flow chart of FIG. 2a only represents one possible scenario among many others. In a method according to the present invention, in a first step 30, the UE 12 sends the RACH RRC connection request signal 18-1 to the SRNC 15. In addition to usual information carried by a RACH RRC connection request, e.g., "initial UE identity" e.g. 8 "spare bits", the signal 18-1 can also contain an additional information such as: signalling bearers and other basic procedures the UE 12 can support before the IMEISV based more detailed error information is available; an error correction level of the UE 12, e.g. detailed indication of corrected behavior or what version of bit map indicative of error corrective functionalities supported by the UE 12, etc. In a next step 31, the SRNC 15 determines if new bit map related information is required for a complete UE setup. This is a very important step determining the following signalling strategy, according to the present invention. In a next step 32, the SRNC 15 sends the FACH RRC connection setup signal 20-1 back to the UE 12 in response to and based on the RACH RRC connection request signal 18-1 (containing bit map information indicative of the error corrective functionalities supported by the UE 12). The signal 20-1 contains normal transport format sets and transport channel information configured based on the bit map information indicative of the error corrective functionalities supported by the UE 12. In a next step 34, the UE 12 sets up a connection based on the information contained in the signal 20-1 and In a next step 36, the UE 12 sends the DCH RRC connection setup complete signal 18-3 to the SRNC 15. In a next step 38, the UE 12 sends the RRC initial direct transfer signal 18-3 containing the IMEISV information to the SRNC 15 and hereafter in a step 40, the SRNC 15 sends the initial UE message signal 22 to the CN 16 (or the CN protocol block 16a) containing, if necessary as determined by the SRNC 15 in the step 31, a new bit map request and the IMEISV information of the UE 12 supplied by the UE 12 in the step 38. As it is described above, the communication between the UE 12 and the CN 16 (or the CN protocol block 16a) can be established directly using signal 21 of FIG. 1a by passing the SRNC 15, thus providing to the CN 16 (or the CN protocol block 16a) the above information (the new bit map request and the IMEISV information of the UE 12) by the UE 12 directly. In steps 36 and 38, the bit map request can be optionally contained in signals 18-2 or 18-3.

In a next step 42, the SRNC 15 sends the measurement control signal 20-2 to the UE 12. In a next step 44, the UE 12 performs configuring of a measurement configuration in response to the measurement control signal from SRNC (15) using the bit map information on supported functionality by the UE 12. In a next step 46, it is confirmed by the SRNC 15 based on the determination of the step 31 whether the new bit map is required or not for completing a radio bearer (RAB) configuration, according to the present invention. As long as no new bit map is required, in a next step 48, the CN 16 (or the CN protocol block 16a) sends the common ID (IMSI) signal 24a to the SRNC 15 and then the process goes to step 56, which is described below. However, if it is ascertained that the new bit map is required, in a next step 50a, the further setup procedure of the UE 12 is on hold until the new bit map is generated by the CN 16. In a next step 50, the common ID (IMSI) signal 24a and a new bit map signal 24b are sent to the SRNC 15 by the CN 16 (or the CN protocol block 16a). The CN protocol block 16a exchange appropriate message signals 17a and 17b with the the error database block 16b while generating the new bit map. Prior to the step 50, the CN 16 optionally can convert the new bit map signal 24b to match the IMEISV of the UE 12. In a next step 52, it is ascertained by the SRNC 15 whether the new bit map signal 24b is converted by the CN 16 to match the IMEISV of the UE 12.

As long as that is the case, the process goes to step 56, which is described below. However, if it is ascertained that the new bit map signal 24b is not converted by the CN 16 to match the IMEISV of the UE 12, in a next step 54, the SRNC 54 converts the new bit map signal 24b to match the IMEISV of the UE 12. In a next step 56, the SRNC 54 configures the security mode command signal 20-3 using the IMEISV information of the UE 12 and optionally the 8 "spare bits" ("initial UE identity") contained in the RACH RRC connection request signal 18-1, and sends the security mode command signal 20-3 to the UE 12. In a next step 58, the UE 12 performs the security mode setup and sends the security mode complete signal 18-4 to the SRNC 15. In a next step 62, the SRNC 15 configures the radio bearer setup signal 20-4 using the new bit map signal 24b and sends the radio bearer setup signal 20-4 to the UE 12. In a step 64, the UE 12 completed the bearer setup using the bearer setup signal 20-4 and sends the radio bearer setup complete signal 18-5 to the SRNC 15. Finally, in a step 66, the UE 12 UE sends inter RAT handover message signal 18-6 to the different radio systems by sending it first to the SRNC 15.

Figure 2B:
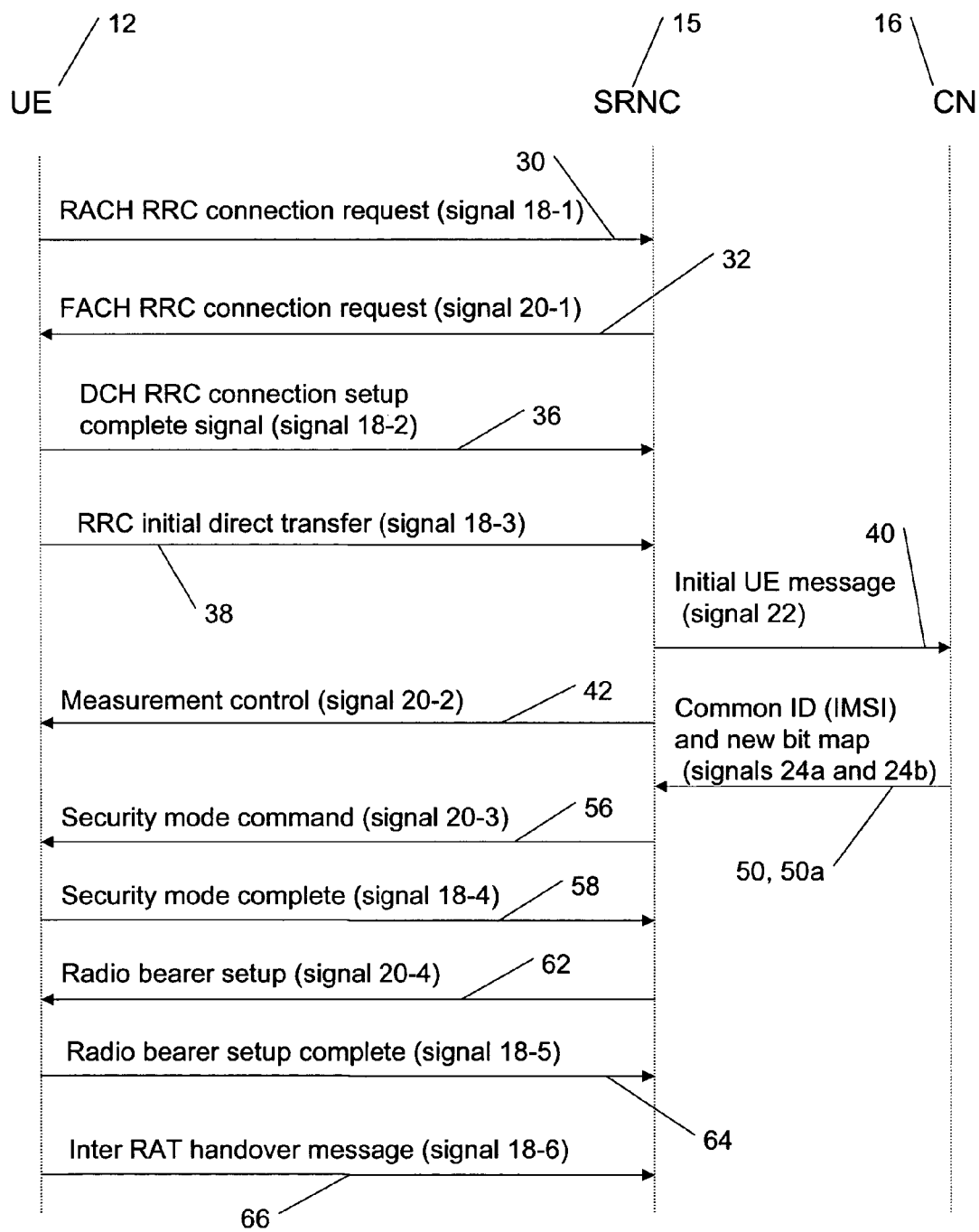
FIG. 2b is an example illustrating a performance of a cellular system (e.g., UMTS) for correcting terminal errors for the flow chart of FIG. 2a, according to the present invention.

FIG. 2b is a simplified illustration of a performance of a cellular system (e.g., UMTS) for correcting terminal errors for the flow chart of FIG. 2a, according to the present invention. All identified steps, network components are already described in FIGS. 1a, 1b and 2a. FIG. 2b demonstrates a typical network connection procedure with imbedded features of a 3GPP Technical Specification (e.g., see 3GPP TS 23.195 v5.1.0), according to the present invention, and depicts a protocol-like exchange of signals between the UE 12, the SRNC 15 and the CN 16, which is described in FIG. 1b using selected steps from the flow chart example of FIG. 2a.

What is claimed is:

1. A method, comprising:
sending a control/report signal to a network of a cellular system by a terminal of the cellular system for initiating setup procedures for correcting or adapting terminal errors in the cellular system, said control/report signal is indicative of a version of a bit map supporting error correcting functionalities of the terminal;

determining by the network whether new bit map related information is required for completing the setup procedures by the terminal;

performing the setup procedures at the terminal using instructions contained in a command/information signal while waiting for the new bit map related information from the network for completing said procedures; and completing the setup procedures by the terminal using further instructions contained in the command/information signal sent by the network, wherein said further instructions are configured by the network using a new bit map signal comprising said new bit map related information generated by the network.

2. The method of claim 1, wherein the control/report signal comprises an international mobile station equipment and a software version number.

3. The method of claim 1, wherein the command/information signal is a measurement control signal and the completing the setup procedures comprising:

configuring by the network and sending said security mode command signal to the terminal; and performing a security mode setup by the terminal using said security mode command signal.

4. The method of claim 1, wherein the command/information signal is a radio bearer setup signal, and said completing the setup procedures comprising:

configuring by the network and sending said radio bearer setup signal to the terminal; and completing a bearer set up by the terminal using said radio bearer setup signal.

5. The method of claim 1, wherein the cellular system is a universal mobile telecommunications system.

6. The method of claim 5, wherein the network comprises a universal terrestrial radio access network and a core network.

7. The method of claim 6, wherein the universal terrestrial radio access network comprises a serving radio network controller.

8. The method of claim 7, wherein the command/information signal is a security mode command signal, which is sent to the terminal by the serving radio network controller; said security mode command signal is generated by the serving radio network controller after receiving the new bit map signal.

9. The method of claim 7, wherein the command/information signal is a radio bearer setup signal, which is sent to the terminal by the serving radio network controller, said radio bearer setup signal is generated by the serving radio network controller after receiving the new bit map signal.

10. The method of claim 7, wherein the control/report signal is a RACH RRC connection request signal, which is sent to the serving radio network controller.

11. The method of claim 10, wherein said determining by the network whether the new bit map related information is required for completing the setup procedures by the terminal is performed by the serving radio network controller upon receiving and based on the RACH RRC connection request signal.

12. The method of claim 11, wherein after the determining by the network if the new bit map related information is required, the method further comprises:

sending a FACH RRC connection setup signal, in response to the PACH RRC connection request signal, to the terminal by the serving radio network controller;

setting up a connection by the terminal using the FACH RRC connection setup signal ; and sending a DCH RRC connection setup complete signal to the serving radio network controller by the terminal.

13. The method of claim 12, further comprising:

sending an RRC initial direct transfer signal to the universal serving radio network controller by the terminal, said RRC initial direct transfer signal comprises an international mobile station equipment and software version number if it is determined that the new bit map related information is required,;

sending an initial UE message signal to the core network by the terminal, said initial UE message signal contains a request for a new bit map and the international mobile station equipment and software version number; and sending a measurement control signal to the terminal by the serving radio network controller.

14. The method of claim 13, wherein said performing the setup procedures at the terminal, while waiting for the bit map related information from the network, is performed by configuring measurement configurations using the measurement control signal by the terminal.

15. The method of claim 14, wherein after said performing the setup procedures at the terminal, the method further comprises:

delaying further setup procedures of the terminal until generating the new bit map signal by the core network, if it is determined that said new bit map signal is required;

sending a common ID signal and a new bit map signal generated by the core network to the serving radio network controller by the core network;

determining by the serving radio network controller if the new bit map signal has to be converted to match the international mobile station equipment and software version number of the terminal; and converting the new bit map signal (24b) to match the international mobile station equipment and software version terminal by the serving radio network controller.

16. The method of claim 7, wherein after said performing the setup procedures at the terminal, the method further comprises:

delaying further setup procedures of the terminal until generating the new bit map signal by the core network, if it is determined that said new bit map signal required; and sending a common ID signal and the new bit map signal generated by the core network to the serving radio network controller by the core network.

17. The method of claim 16, wherein the new bit map signal is generated using a core network protocol block of the core network and an error database block of the core network.

18. A cellular system comprising:

a terminal, for providing a control/report signal which is indicative of a version of a bit map supporting error correcting functionalities of the terminal for correcting or adapting terminal errors in the cellular system, responsive to a command/information signal or performing setup procedures of the terminal using instructions comprised in said command/information signal while waiting for new bit map related information, and for completing the setup procedures using further instructions comprised in said command/information signal; and a network, responsive to said control/report signal, for determining if said new bit map related information is required for completing the setup procedures by the terminal using said control/report signal, for providing said command/information signal comprising said instructions and said further instructions to the terminal before and after said determination, respectively, wherein said further instructions are configured by the network using a new bit map signal comprising said new bit map related information generated by the network.

19. The cellular system of the claim 18, wherein the network comprises:

a universal terrestrial radio access network, responsive to a common ID signal, to the new bit map signal and to the control/report signal, for determining if said new bit map related information is required for completing the setup procedures by the terminal using said control/report signal, for providing said command/information signal to the terminal ; and a core network, responsive to the control/report signal, for generating the new bit map signal, for providing the common ID signal and for providing the new bit map signal to the universal terrestrial radio access network.

20. The cellular system of claim 18, wherein the control/report signal comprises an international mobile station equipment and software version number.

* * * * *

UNITED STATES PATENT AND TRADEMARK OFFICE
CERTIFICATE OF CORRECTION

PATENT NO. : 7,346,349 B2 Page 1 of 1
APPLICATION NO. : 10/702217
DATED : March 18, 2008
INVENTOR(S) : Jussi Numminen et al.

It is certified that error appears in the above-identified patent and that said Letters Patent is hereby corrected as shown below:

In column 9, line 64, which is claim 12, line 5, after "PACH" should be -- RACH --.

In column 10, line 9, which is claim 13, line 7, ";" or "," should be deleted. Also wrong in amended claim.

In column 10, line 37, which is claim 15, line 17, after "version" -- number of the -- should be inserted.

In column 10, line 44, which is claim 16, line 6, after "signal" -- is -- should be inserted.

In column 10, line 58, which is claim 18, line 6, "or" should be -- for --.

Signed and Sealed this

Twenty-third Day of December, 2008

JON W. DUDAS
*Director of the United States Patent and Trademark Office*